US012348932B2

(12) United States Patent
Eichfeld et al.

(10) Patent No.: US 12,348,932 B2
(45) Date of Patent: *Jul. 1, 2025

(54) HEARING ASSISTANCE USING ACTIVE NOISE REDUCTION

(71) Applicant: Bose Corporation, Framingham, MA (US)

(72) Inventors: Jahn Dmitri Eichfeld, Natick, MA (US); Daniel M. Gauger, Jr., Berlin, MA (US); Ryan C. Silvestri, Franklin, MA (US); Ryan terMeulen, Watertown, MA (US)

(73) Assignee: Bose Corporation, Framingham, MA (US)

( * ) Notice: Subject to any disclaimer, the term of this patent is extended or adjusted under 35 U.S.C. 154(b) by 526 days.

This patent is subject to a terminal disclaimer.

(21) Appl. No.: 17/672,866

(22) Filed: Feb. 16, 2022

(65) Prior Publication Data

US 2022/0174430 A1 Jun. 2, 2022

Related U.S. Application Data

(60) Continuation of application No. 16/846,681, filed on Apr. 13, 2020, now Pat. No. 11,297,443, which is a (Continued)

(51) Int. Cl.
*H04R 25/00* (2006.01)
*G10K 11/178* (2006.01)
(Continued)

(52) U.S. Cl.
CPC ..... *H04R 25/453* (2013.01); *G10K 11/17861* (2018.01); *G10K 11/17881* (2018.01);
(Continued)

(58) Field of Classification Search
CPC .... H04R 1/1016; H04R 1/1083; H04R 1/406; H04R 3/04; H04R 5/027; H04R 25/405;
(Continued)

(56) References Cited

U.S. PATENT DOCUMENTS 8,229,127 B2 * 7/2012 Jorgensen ........ G10K 11/17873 381/318
11,297,443 B2 * 4/2022 Eichfeld .............. H04R 25/405
(Continued)

FOREIGN PATENT DOCUMENTS

JP 2000059876 A 2/2000
JP 2000089799 A 3/2000
(Continued)

OTHER PUBLICATIONS

Second Office Action dated Nov. 6, 2023 for Japanese Application No. 2021-124346.

*Primary Examiner* — Huyen D Le

(57) ABSTRACT

In general, in one aspect, a hearing aid has an ANR circuit and an ear tip that acoustically occludes the ear. Such a hearing aid provides greater gain to sounds than would be stable in the same hearing aid with a vented ear tip. The ear tip and the ANR circuit in combination attenuate sounds reaching the ear canal through the hearing aid to a first level. The hearing aid detects sounds arriving at a microphone, amplifies those sounds, and provides the amplified sounds to the ear canal at a second level and later in time than the same sounds arrive at the ear canal through the ear tip. The first level is at least 14 dB greater than the second level, such that the amplified sounds do not interact with the passive sounds to result in spectral combing.

12 Claims, 2 Drawing Sheets

Related U.S. Application Data division of application No. 15/789,085, filed on Oct. 20, 2017, now Pat. No. 10,623,870.

(60) Provisional application No. 62/411,044, filed on Oct. 21, 2016.

(51) Int. Cl.

| | |
|---|---|
| ***H04R 5/027*** | (2006.01) |
| *H04R 1/10* | (2006.01) |
| *H04R 1/40* | (2006.01) |

(52) U.S. Cl.

CPC ........... *H04R 5/027* (2013.01); *H04R 25/405* (2013.01); *H04R 25/505* (2013.01); *G10K 2210/1081* (2013.01); *G10K 2210/111* (2013.01); *H04R 1/1016* (2013.01); *H04R 1/1083* (2013.01); *H04R 1/406* (2013.01); *H04R 25/554* (2013.01); *H04R 2460/01* (2013.01); *H04R 2460/05* (2013.01)

(58) Field of Classification Search

CPC .. H04R 25/453; H04R 25/505; H04R 25/554; H04R 2460/01; H04R 2460/05

See application file for complete search history.

(56) References Cited

U.S. PATENT DOCUMENTS

| | | | | |
|---|---|---|---|---|
| 11,330,358 | B2 * | 5/2022 | Ganeshkumar .. | G10K 11/17873 |
| 2013/0208896 | A1 * | 8/2013 | Chatlani .................. | H04R 5/04 381/17 |
| 2015/0230026 | A1 * | 8/2015 | Eichfeld .............. | H04R 25/407 381/26 |

FOREIGN PATENT DOCUMENTS

| | | | |
|---|---|---|---|
| JP | 2009532926 | A | 9/2009 |
| JP | 2013051624 | A | 3/2013 |
| JP | 2014030254 | A | 2/2014 |

* cited by examiner

HEARING ASSISTANCE USING ACTIVE NOISE REDUCTION

CROSS-REFERENCE TO RELATED APPLICATIONS

This application is a continuation of U.S. patent application Ser. No. 16/846,681, filed on Apr. 13, 2020, which is a division of U.S. patent application Ser. No. 15/789,085, filed on Oct. 20, 2017, which claims priority to provisional application 62/411,044, filed Oct. 21, 2016. The aforementioned patent applications are hereby incorporated by reference in their entireties.

BACKGROUND

This disclosure relates to improvements in hearing assistance devices through the use of active noise reduction.

Hearing assistance devices, such as hearing aids and personal sound amplification products (PSAPs), as well as some conventional or specialized headphones, detect sound in the environment of a user and amplify it to improve the ability of the user to hear it. Hearing aids, in particular, may adjust the character of the amplified sound based on the unique hearing loss profile of the user. PSAPs and headphones may also be personalized. To a large extent, the distinction between a hearing aid and a PSAP is one of intended use determined in part by marketing—PSAP and hearing aid features may be added to conventional headphones or specialized headphones, such as tactical headphones, through internal or external software, or through hardware. The terms “hearing assistance device,” “headset,” “earphone,” and “headphone” in this disclosure refer to any such product, without regard to the regulatory status or marketing position of the product. The terms are also not meant to limit the physical form-factor of the product, though certain examples may only apply to some form-factors.

Active noise reduction (ANR) headsets typically employ either feedback or feed-forward ANR, or both. Feedback ANR is accomplished by filtering a signal from a microphone coupled to the ear canal through a control loop, then outputting that signal through a loudspeaker (typically referred to in the context of hearing aids as a “receiver”). Feedforward ANR is accomplished by filtering a signal from a microphone on the outside of the earphone through a filter, then outputting that signal through a loudspeaker. The signals output by the loudspeaker in either arrangement destructively interfere with acoustic signals reaching the ear canal through passive paths, i.e., through the head, through the headphones, or around the headphones, and reduce the total acoustic energy reaching the ear drum.

SUMMARY

In general, in one aspect, a hearing aid has an active noise reduction (ANR) circuit and an earphone that acoustically occludes the ear. Such a sealed hearing aid provides greater gain to sounds than would be stable in the same hearing aid with a vented ear tip.

In general, in one aspect, a hearing aid includes an active noise reduction (ANR) circuit, an earphone that acoustically occludes the ear, and a aided-path microphone located forward of the user’s pinna. The hearing aid provides greater gain to sounds at frequencies between at least 500 Hz and 12 kHz than would be stable in a similar hearing aid with the same microphone location and with a vented earphone.

Implementations may include one or more of the following, in any combination. The hearing aid may provide at least 6 dB more gain than would be stable in the similar hearing aid. The hearing aid may provide at least 12 dB more gain than would be stable in the similar hearing aid.

In general, in one aspect, a hearing aid includes microphones having directional sensitivity, an active noise reduction (ANR) circuit, and an earphone that seals the ear. The earphone and the ANR circuit in combination attenuate sounds reaching the ear canal through the hearing aid, the resulting residual sounds being attenuated by a first amount. The microphones provide sounds that originate from a non-desired direction to the ear canal attenuated by a second amount relative to provided sounds that originate from a desired direction. The first amount of attenuation is sufficiently high that sounds from the desired direction are not significantly modified by the combined residual sounds and the non-desired sounds from the microphone.

Implementations may include one or more of the following, in any combination. The hearing aid may provide gain to the sounds from the microphones at a level less than the amount by which the combined residual sounds and non-desired sounds from the microphones are attenuated at the ear canal relative to the desired directional sounds. The amount of attenuation by the ANR circuit may be at least 2× the amount of directional attenuation provided by the microphones at frequencies below 1 kHz. When the apparatus is worn in a user’s ear, the microphones may be located forward of the user’s pinna. At least one of the microphones having directional sensitivity may be also used by the ANR circuit to detect ambient sounds.

In general, in one aspect, a hearing aid provides amplified sounds to an ear while preventing spectral combing resulting from the amplified sounds interacting with residual sounds. The hearing aid includes an active noise reduction (ANR) circuit and an earphone that seals the ear. The earphone and the ANR circuit in combination attenuate sounds reaching the ear canal through the hearing aid by a first amount of gain, resulting in residual sounds. The ANR circuit includes an internal microphone acoustically coupled to the ear canal when the apparatus is worn, and reduces an occlusion effect in the ear canal caused by the sealing of the ear canal. The hearing aid detects sounds arriving at an external microphone, amplifies those sounds by a second amount of gain, and provides the amplified sounds to the ear canal later in time than the residual sounds arrive at the ear canal through the earphone. Amplification of the detected sounds by the second amount of gain results in the amplified sounds being at least 14 dB greater than the residual sounds at the ear canal.

Implementations may include one or more of the following, in any combination. The hearing aid may provide less than 14 dB of gain to the sounds arriving at the external microphone. The second amount of gain may result in the amplified sounds having a level at the ear canal that is less than a level at which the sounds arrive at the external microphone. The second amount of gain may result in the amplified sounds having a level at the ear canal that is less than a level at which the sounds would arrive at the ear if the apparatus were not present. The amplified sounds may be provided to the ear canal at least 1 ms later in time than the residual sounds arrive at the ear canal through the earphone. When the apparatus is worn in a user’s ear, the external microphone may be located forward of the user’s pinna. The ANR circuit may use signals from the external microphone to provide feed-forward ANR in combination with providing feedback ANR. The first amount of gain, as provided by the ANR circuit, may be controlled as a function of ambient noise levels.

In general, in one aspect, a system provides amplified sounds from a remote microphone to an ear while preventing spectral combing and echo resulting from the amplified sounds interacting with directly-heard sounds. The system includes a hearing aid with an active noise reduction (ANR) circuit and an earphone that seals the ear, and a microphone remote from the hearing aid, providing audio signals to the hearing aid through a wireless link. The earphone and the ANR circuit in combination attenuate sounds reaching the ear canal through the hearing aid by a first amount of gain, resulting in residual directly-heard sounds. The ANR circuit includes an internal microphone acoustically coupled to the ear canal when the apparatus is worn, and reduces an occlusion effect in the ear canal caused by the sealing of the ear canal. The hearing aid receives sound signals transmitted by the remote microphone, amplifies those sounds by a second amount of gain, and provides the amplified sounds to the ear canal later in time than the residual directly-heard sounds arrive at the ear canal through the earphone. Amplification of the transmitted sounds by the second amount of gain results in the amplified transmitted sounds being at least 14 dB greater than the residual directly-heard sounds at the ear canal.

Implementations may include one or more of the following, in any combination. The hearing aid may provide less than 14 dB of gain to the sounds received from the remote microphone. The second amount of gain may result in the amplified transmitted sounds having a level at the ear canal that is less than a level at which the sounds would arrive at the ear if the hearing aid were not present. The amplified transmitted sounds may be provided to the ear canal at least 1 ms later in time than the residual directly-heard sounds arrive at the ear canal through the earphone.

Advantages include reducing the occlusion effect, improving the audibility of directional hearing assistance audio, improving audio fidelity, increasing the maximum stable gain that can be applied, increasing the allowable signal processing-imposed latency, and simplifying hardware design.

All examples and features mentioned above can be combined in any technically possible way. Other features and advantages will be apparent from the description and the claims.

DESCRIPTION

Figure 1:
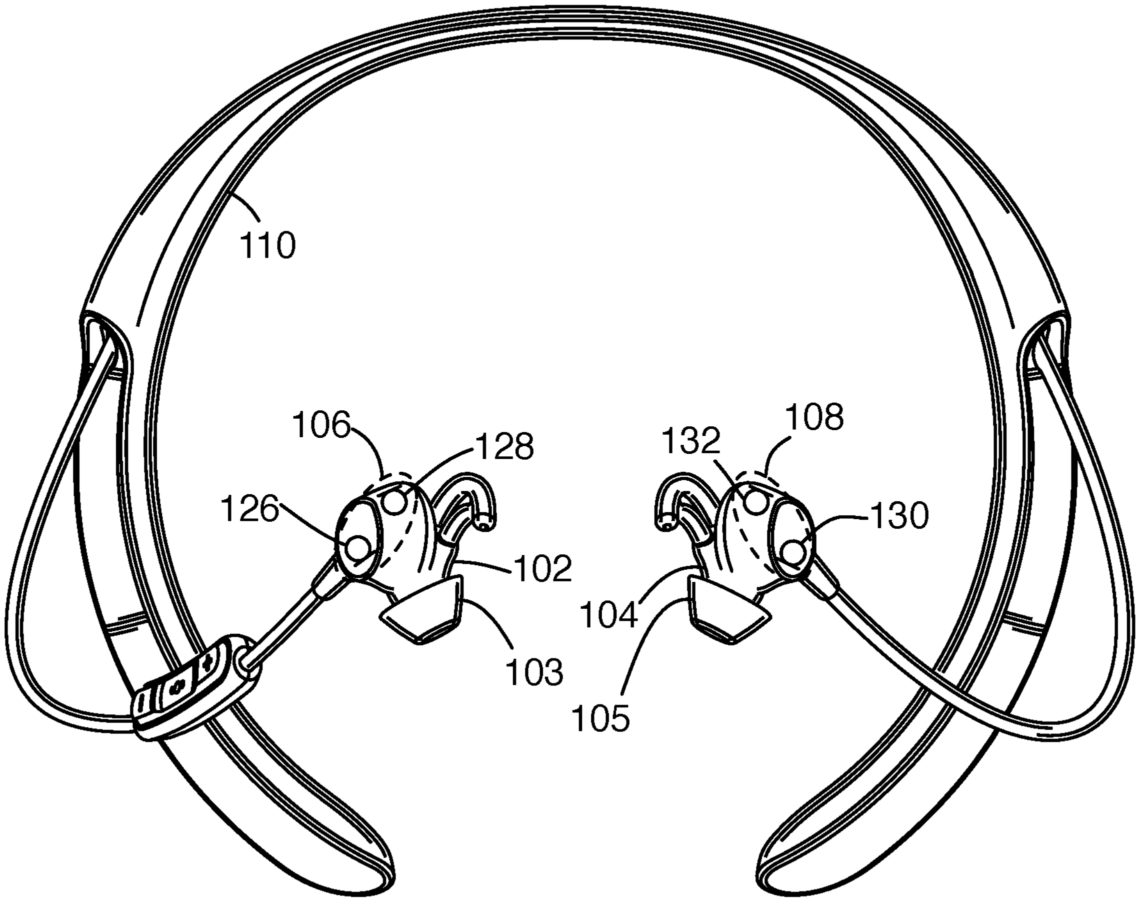
FIG. 1 shows a set of headphones.

Many in-ear devices, particularly those that attempt to seal the ear canal, suffer from the occlusion effect. The occlusion effect amplifies lower-frequency components of the user's own voice due to the acoustic blockage of the ear canal. Pressure due to the user's voice radiates through the head and into the ear canal. When the ear is not occluded, the pressure escapes out of the ear; when the ear is occluded, and the pressure can't escape, low-frequency components are grossly amplified inside the user's ear. Occluding the ear causes an additional problem—blocking of the ear canal prevents higher frequency components of the user's voice from traveling around the head and back in the ear. These two issues result in undesirable own-voice quality, typically perceived as the user's voice being "boomy" or "muffled." By "own-voice," we refer to the user's perception of their own voice while speaking. A typical solution to this problem in hearing instruments is to provide an acoustic vent through the device, allowing pressure (including sound pressure) within the ear to escape through the vent thereby reducing the occlusion effect. The aided path of the hearing instrument restores the higher-frequency components of the user's voice (amplifying them, if needed due to the user's hearing loss), so the total own-voice signal sounds more natural. The vent used to relieve the occlusion effect may also contribute to allowing some high-frequency voice content to enter the ear. The vent, however, introduces other problems.

First, the vent creates an acoustic feedback path between the loudspeaker output and the microphone on the outside of the device, which is meant to detect sound surrounding the user for amplification. The increase in acoustic coupling between the loudspeaker output and microphone input makes the system more susceptible to acoustic oscillation, i.e., audible feedback or squealing. Oscillation is prevented by several measures, but most effectively by reducing the maximum amount of gain the device can apply, so that it doesn't reach the point where oscillation occurs. This prevents instability, but compromises the ability of an amplified product to provide its intended function. We refer to the maximum gain that can be applied without causing oscillation, at any frequency, as maximum stable gain.

Second, the vent reduces the efficiency and bandwidth of the loudspeaker. The acoustic impact of the vent is such that the loudspeaker must drive a larger effective acoustic volume. This significantly lowers the acoustic system efficiency, especially at lower frequencies. This in turn can result in poor bandwidth, for example, the low-frequency cut-off of the system may be insufficient for reproducing the lowest frequencies of speech, let alone music. A 2 mm diameter vent for an in-ear device, for example, limits the output of a typical loudspeaker below approximately 500 Hz, above the lowest frequencies of speech, and well above the lowest frequencies of music.

Third, the vent allows more sound from the environment to pass through the device and enter the ear than if there was no vent. This "passive path" through the device is combined inside the ear with the "aided path," which is the output of hearing-related signal processing through the loudspeaker, e.g., an amplified representation of the outside sound. We refer to the reduction of sound reaching the ear through the passive path, due to the presence of the earphone, as passive insertion loss. A vent makes the passive insertion loss lower, which increases the magnitude of the passive path contribution to the combined (active plus passive) signal. Several problems result from the increased passive path contribution.

When the acoustic signals from the passive and aided paths are similar in magnitude and close but not identical in arrival time at the ear drum, spectral combing occurs. This is because the aided path is correlated with the passive path but contains greater latency (later arrival time) due to the signal processing. In some examples, the amount of latency is as high as 5 ms; even latency of 1 ms may be distracting. A hearing aid that is shaping the sounds may have greater latency than a PSAP that is merely amplifying them, but other processing, such as filtering signals from multiple microphones to control directivity, also adds latency. Effectively, any device with any amount of signal processing will introduce latency. This interaction can result in the perceived spectrum of environmental sounds being "tinny," "comby,"

"tube-like," or otherwise undesirable and of poor fidelity. The perceptibility of this effect can be reduced by adding substantial gain to the aided path. Up to 20 dB of gain may be required on the aided path to significantly suppress the combing effect, i.e., by vastly exceeding the contribution of the passive path, but this amount of gain may exceed the maximum stable gain of the device. That much gain may also be uncomfortably loud for the user when the environmental sound level is already high and audible through the passive path, or if the user has only a mild impairment.

Another problem caused by having low passive insertion loss arises when the external microphones are highly directional. Directional processing, either through microphones with directional sensitivity or by filtering arrays of microphones in beamforming patterns, is typical for a hearing assistance device. See, for example, U.S. Pat. No. 9,560,451, the entire contents of which are incorporated here by reference. Such processing is done in the aided path, the result of which is that sounds at certain angles are attenuated relative to sound coming from a desired angle. This is frequency-dependent, with less attenuation at lower frequencies due to physical limitations of microphone spacing and other practical concerns. When the level of sounds at the desired angles arriving via the aided path is similar to the level of the sounds at the undesired angles sounds arriving through the passive path, which is exacerbated by a vent, the attenuation due to directional processing in the microphones is undone. In other words, the passive path "fills in" the attenuation in the aided path. The summing of the passive path and aided path signals does increase the level of sounds coming from the non-attenuated direction, but bringing along the sounds from the attenuated directions decreases the ratio of non-attenuated to attenuated sound. This makes directional processing effectively less directional when the aided path has low output relative to the passive path. At lower frequencies in typical approaches, where the aided path already has low-frequency noise (e.g., due to lack of directivity), combining the aided path with the residual path does nothing to help intelligibility. In the aided path in typical approaches, the attenuation due to directional processing at higher frequencies can be significant at some angles. The attenuation in the null of a hypercardioid, for example, is theoretically infinite. Practical issues limit this attenuation to 18 dB or so. In this case, the aided path would require 18+ dB more output than the contribution of the passive path to provide the full available directivity. Again, however, this additional gain may result in a signal that is objectionably loud to the user, especially if that user has a mild or moderate hearing loss, or it may exceed the maximum stable gain.

Figure 2:
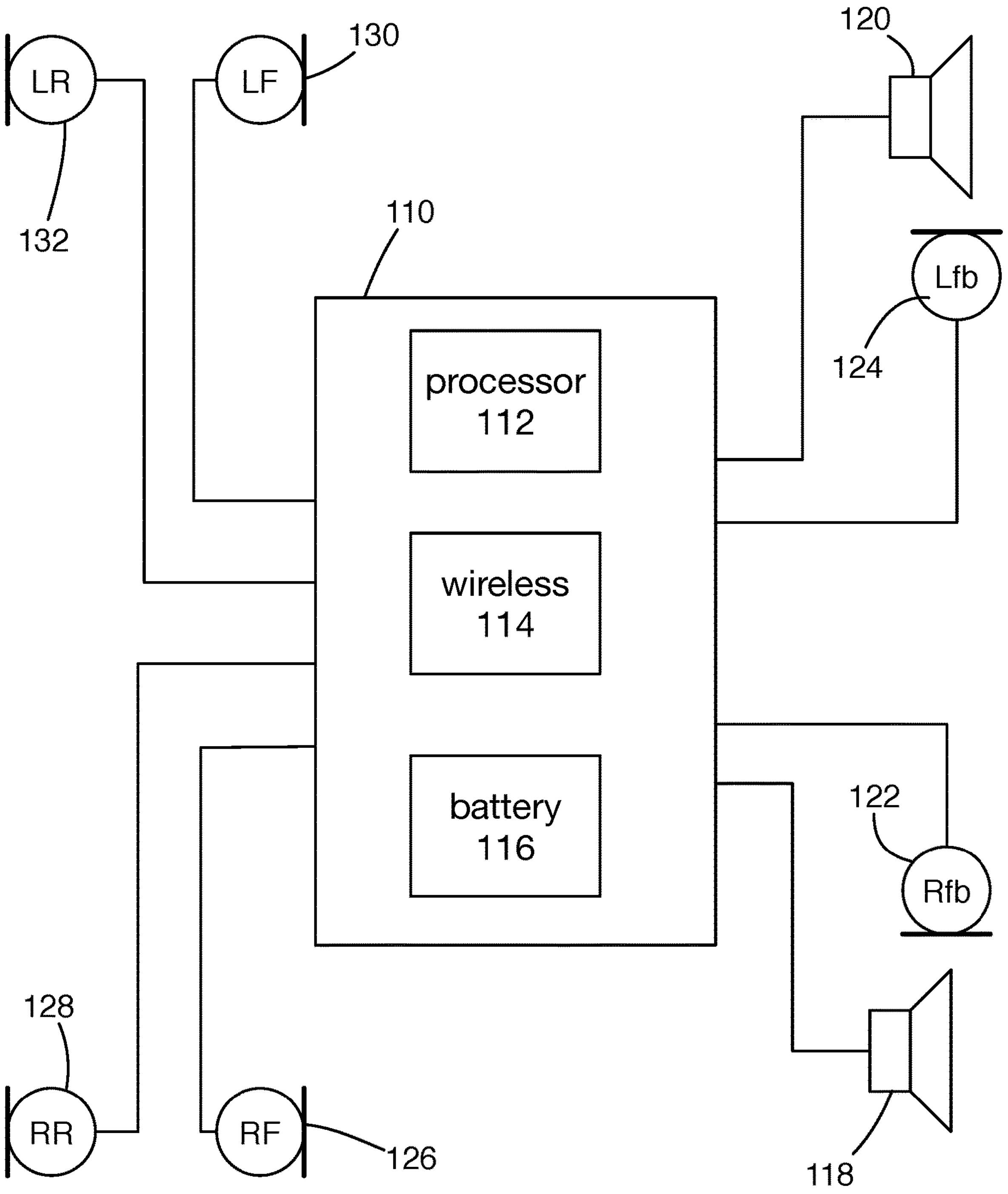
FIG. 2 shows a schematic block diagram of the headphones of FIG. 1.

In a new headphone architecture shown in FIG. 1, two earphones 102, 104 each contain a two-microphone array, 106 and 108. The two earphones 102, 104 are connected to a central unit 110, worn around the user's neck in this particular example. The earphones include ear tips 103, 105 which seal the entrance to the user's ear canal. As shown schematically in FIG. 2, the central unit includes a processor 112, wireless communications system 114, and battery 116. The earphones also each contain a speaker, 118, 120, and additional microphones 122, 124 used for providing feedback-based active noise reduction. The microphones in the two arrays 106 and 108 are labelled as 126, 128, 130, and 132. These microphones serve multiple purposes: their output signals are used as ambient sound to be cancelled in feed-forward noise cancellation, as ambient sound (including the voice of a local conversation partner) to be enhanced for hearing or conversation assistance, as voice sounds to be transmitted to a remote conversation partner through the wireless communications system, and as side-tone voice sounds to play back for the user to hear his own voice while speaking. A line through each pair of microphones points generally forward when the headphone is worn by a typical user, to optimize detection of sound from the direction where the user is looking. The earphones are arranged to point their respective pairs of microphones slightly inward when worn, so the lines through the microphone arrays converge a meter or two ahead of user. This has the particular benefit of optimizing the reception of the voice of someone facing the user.

Incorporating ANR into a hearing assistance device addresses the problems mentioned above, while also providing additional benefits. Feedback ANR has a unique advantage in that any signal present in the ear canal will be treated as an undesired excitation, which the feedback control loop will attempt to minimize. This results in not only the reduction of environmental noise, but also the reduction of the user's own voice when speaking. In particular, feedback ANR is most effective at lower frequencies, substantially overlapping in bandwidth with those where the occlusion effect tends to amplify the user's voice. Fully occluding ear tips (i.e., ear tips with no vent and a high passive insertion loss) that seal the ear canal are typically used in ANR products so as to maximize passive isolation of external noise. These ear tips also excite the occlusion effect to a great extent, but as noted, that is counteracted by the feedback ANR. The reduction of the occlusion effect in occluding headphones with feedback ANR is typically sufficient that users can speak with less objection to their own voice quality.

As a result of this, feedback ANR enables the use of a sealed ear tip in a hearing assistance device without causing the users' own voice to be objectionable. This addresses a number of the previously-discussed problems. For one, acoustic coupling between the loudspeaker and the outside microphone (used for the aided path) is reduced relative to a vented ear tip. This results in higher maximum stable gain for the aided path, allowing greater gain range and correction of greater hearing loss. Second, less gain is needed in the aided path to overcome ambient noise. Improving upon the passive insertion loss with the addition of feedback ANR, creating a net lower unaided or residual path insertion loss, also results in an improved spectral response for the aided path, as there is less energy from the residual path to cause destructive interference with the (delayed) aided path. It also allows the benefits of directional microphone processing to be realized, in that sounds from the angles at which there is attenuation in the microphone response will also be attenuated through the residual path, so the sounds in the target direction will not be masked. Enabling these benefits with lower gain can also result in more comfortable sound pressure levels within the ear. The efficiency and bandwidth of the loudspeaker are also improved relative to vented ear tips, since the loudspeaker drives a much smaller acoustic volume (i.e., the ear canal only). In addition, the increase in low frequency output allows for greater feed-forward noise reduction without requiring excessive controller gain, which can be problematic. Yet another advantage is that the sealed ear tip reduces the passive path signal level above the effective ANR bandwidth due to the increased acoustic impedance of the sealing material.

In addition to counteracting the problems caused by a vent typical of hearing assistance devices, the use of ANR in a hearing assistance device presents unique benefits. One benefit is the decrease in the total sound level reaching the ear. Active noise reduction can result in total attenuation (active noise reduction in combination with passive insertion loss) of over 30 dB, even at low frequencies. This additional attenuation makes directional processing even more effective, especially at lower frequencies where, as noted above, the directional attenuation is lower. Typically, hearing aids are not designed to provide significant directional gain below several hundred Hz, since aided path gain is not needed in that frequency range for more common, predominantly high-frequency hearing losses (i.e., to save size and cost, hardware is used that does not provide gain where it is not needed to correct hearing loss). Hence, the aided and residual paths are similar in magnitude at low frequencies, and the aided path signal is masked by the residual path at angles where there would otherwise be substantial attenuation due to directional processing. This is the same problem as mentioned above, but at low frequencies, typical non-occluding hearing aids can't address it with gain, even if that gain would be stable and tolerable. The use of ANR reduces the level of sound from the residual path at low frequencies, allowing the aided path signals to remain relatively higher for sounds from the desired direction. Additionally, sub-speech-band noise that could potentially degrade speech intelligibility due to upward spread of masking is also attenuated.

The decrease in total sound from the environment at the ear also allows users to reduce the desired-signal output of the device in loud environments, perhaps below the level at which desired sounds could be heard without a device, while still taking advantage of directional processing. This would, for example, help a user with normal hearing improve intelligibility in noise, even while attenuating the environmental level for sake of added comfort. It may also be valuable for preventing further hearing loss, as the user doesn't have to listen to their desired content (whether from hearing assistance or from other sources) at such high signal levels even without giving up intelligibility.

As noted above, as much as 20 dB of gain may be required on the aided path to significantly suppress the combing effect resulting from latency in the signal processing. With ANR, this difference can be realized through a combination of attenuation and gain, hence less total gain. In general, a 14 dB difference between aided path and residual path, from a combination of gain and noise reduction, will reduce combing to tolerable levels.

Other benefits of ANR include more flexibility in placing the outside microphone. The lack of a vent allows more freedom in locating the microphone, perhaps closer to the loudspeaker where there may otherwise be too much acoustic coupling between the inside and outside of the ear canal through a vent. In particular, the microphone can be located forward of the user's pinna, i.e., near the concha, rather than behind the ear, as in traditional hearing aids. Locating the microphones here can improve the ability of the user to localize on the sources of sounds heard through the aided path. Locating the microphones forward of the pinna has the added advantage of allowing the same microphones to be used for the feed-forward portion of the ANR circuitry.

An additional benefit of using ANR in a hearing device pertains to the use of a so-called remote microphone. Remote microphones are used with some hearing devices, where the user places a microphone near a talker, rather than relying on microphones located at the hearing device. The close proximity of a microphone to a talker creates a significant signal-to-noise ratio (SNR) gain, aiding intelligibility of that talker for the device user. Wireless links are commonly used to transmit the talker signal to the device user. A side-effect of common digital wireless technology is increased latency. The increase in latency presents a problem in that the hearing device user may hear the direct path speech from the talker in addition to the remote microphone signal, and the microphone signal is significantly delayed relative to the direct path speech. These two paths result in an audible echo, which can degrade speech intelligibility and frustrate the listener. When ANR is used in the hearing device, the direct path speech can be significantly attenuated by either reducing the entire aided path, or by reducing the reception of the talker through beamforming, or both. This effectively reduces the echo, allowing the user to hear the high-SNR remote microphone signal without an echo component from the direct path, despite the latency.

Utilizing ANR in a hearing device can present challenges. One, in particular, is increased system power consumption. Higher data rates within a DSP required for digital ANR, for example, can consume significant power. The increase in power consumption can increase the size of the battery and hence the entire device. This can have negative impacts to consumer acceptability of the device form factor, for example. To avoid this problem, ANR can be selectively activated when it provides benefit, while deactivated when the benefit is not needed or would not be realized. In one example, ANR can be enabled in high-noise environments where improved comfort due to attenuation of environmental noise is beneficial, and this can be done automatically within a product through comparison of measured acoustic noise level and pre-determined on/off thresholds. In another example, ANR can be enabled when directivity is enabled. In another example, ANR can be enabled when the user is speaking, which can also be automatically detected as covered in U.S. patent application Ser. No. 15/609,297. ANR can be disabled according to the opposite of the above examples, and in other cases. In one example, ANR can be disabled when the battery level is low. In another example, ANR can be disabled when audio is streaming at a level greater than the aided path level. Many other examples exist beyond the above non-limiting examples.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, solid-state drives, flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. References to a processor may refer to any number of processors or sub-processors, or the same or different type, working together. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An apparatus comprising an active noise reduction (ANR) circuit for providing ANR; and an earphone including an ear tip that seals an ear canal when the apparatus is worn, wherein the earphone and the ANR circuit in combination attenuate sounds reaching the ear canal through the apparatus by a first amount of gain, resulting in residual sounds, the ANR circuit includes an internal microphone acoustically coupled to the ear canal when the apparatus is worn, and reduces an occlusion effect in the ear canal caused by the sealing of the ear canal, wherein the apparatus is configured to detect when the user is speaking, and, in response, automatically enable the ANR, wherein the apparatus detects sounds arriving at an external microphone, amplifies those sounds by a second amount of gain, and provides the amplified sounds to the ear canal later in time than the residual sounds arrive at the ear canal through the earphone, and wherein the amplification of the detected sounds by the second amount of gain results in the amplified sounds being at least 14 dB greater than the residual sounds at the ear canal.

2. The apparatus of claim 1, wherein the apparatus provides less than 14 dB of gain to the sounds arriving at the external microphone.

3. The apparatus of claim 1, wherein the second amount of gain results in the amplified sounds having a level at the ear canal that is less than a level at which the sounds arrive at the external microphone.

4. The apparatus of claim 1, wherein the second amount of gain results in the amplified sounds having a level at the ear canal that is less than a level at which the sounds would arrive at the ear canal if the apparatus were not present.

5. The apparatus of claim 1, wherein the amplified sounds are provided to the ear canal at least 1 ms later in time than the residual sounds arrive at the ear canal through the earphone.

6. The apparatus of claim 1, wherein when the apparatus is worn in a user's ear, the external microphone is located forward of the user's pinna.

7. The apparatus of claim 6, wherein the apparatus further comprises a battery located rearward of the user's pinna when the apparatus is worn.

8. The apparatus of claim 1, wherein the ANR circuit further uses signals from the external microphone to provide feedforward ANR in combination with providing feedback ANR.

9. The apparatus of claim 1, wherein the apparatus is configured to automatically disable the ANR when the user is not speaking.

10. The apparatus of claim 1, wherein the apparatus is configured to automatically disable the ANR when the apparatus is streaming audio at a level greater than an aided path level.

11. The apparatus of claim 1, wherein the apparatus is configured to automatically enable the ANR when directivity is enabled.

12. The apparatus of claim 1, wherein the apparatus is configured to automatically disable the ANR when a battery level is low.

* * * * *